March 6, 1951  L. F. SANTUCCI ET AL  2,544,397
SLIDING COCKPIT ENCLOSURE FOR AIRCRAFT
Filed Sept. 1, 1945  2 Sheets-Sheet 2
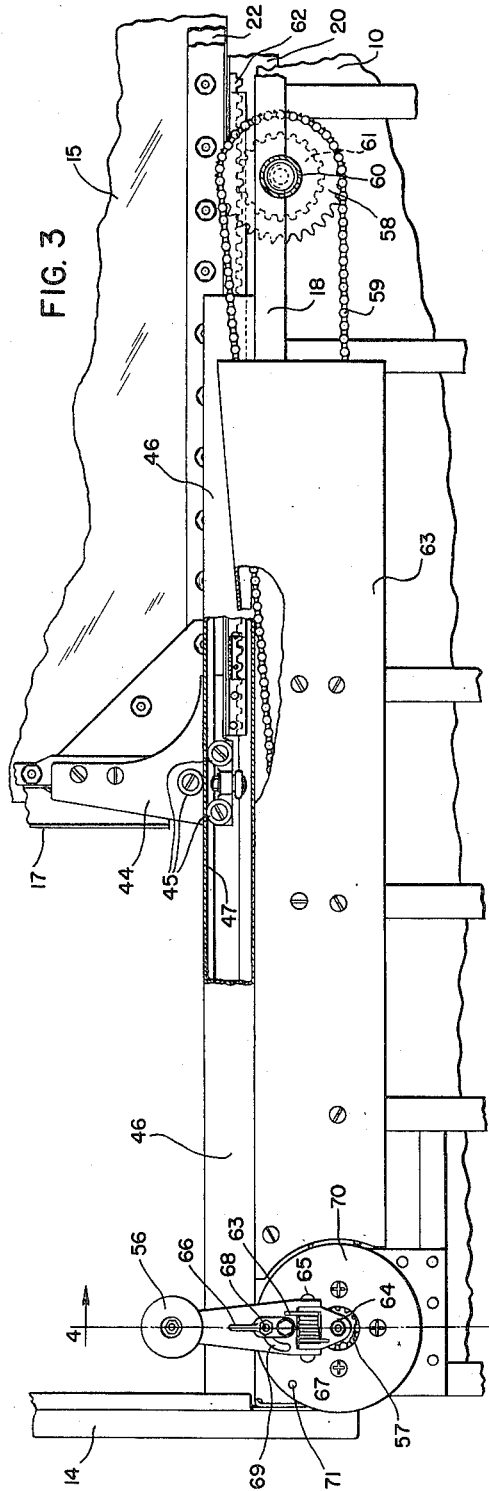
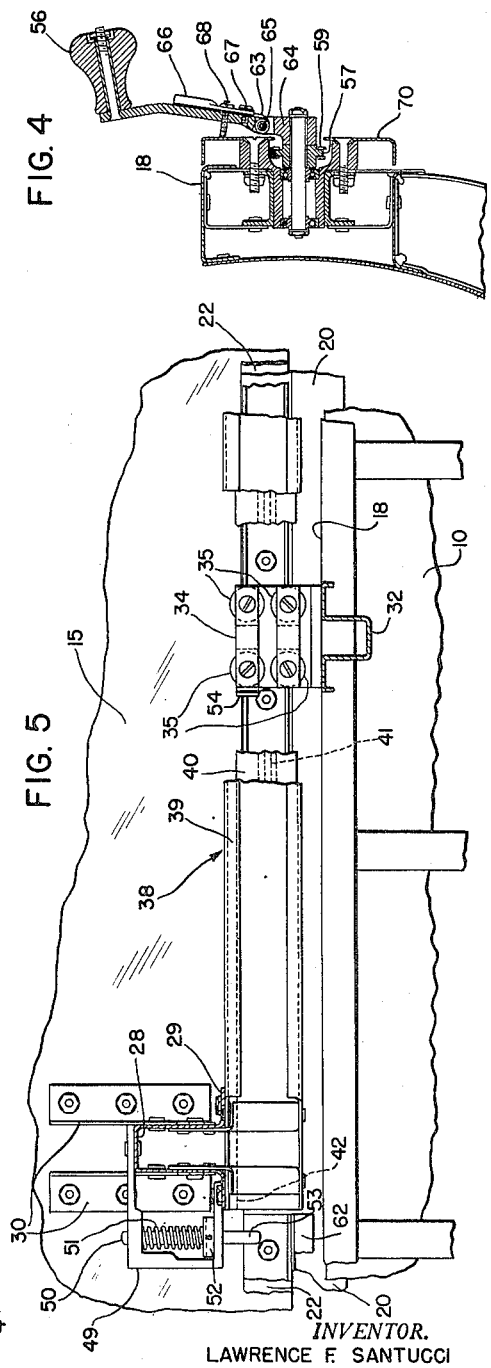
INVENTOR.
LAWRENCE F. SANTUCCI
JOSEPH S. SHOWALTER
BY George F. Goodyear
ATTORNEY Patented Mar. 6, 1951

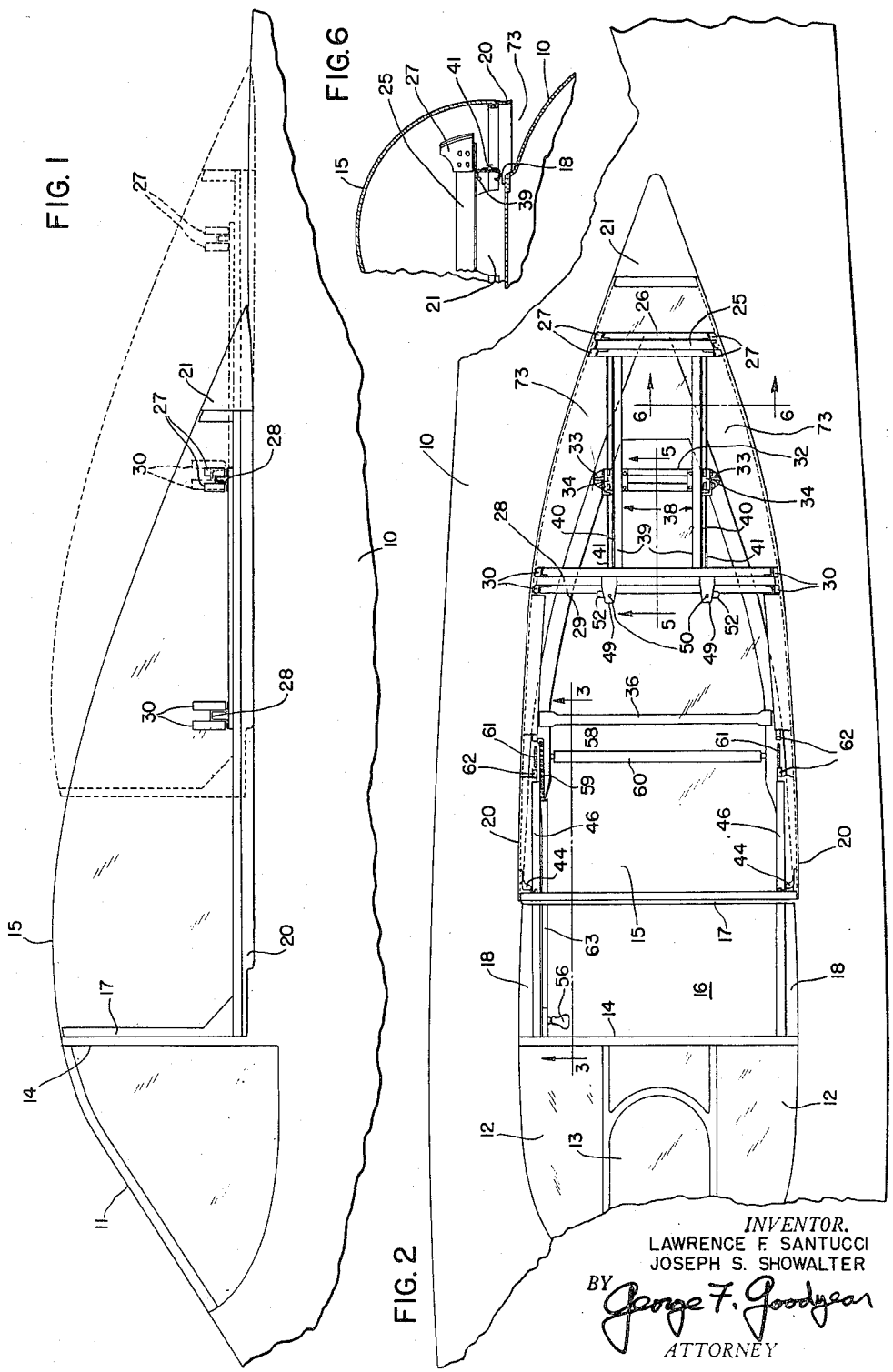

2,544,397

UNITED STATES PATENT OFFICE 2,544,397

SLIDING COCKPIT ENCLOSURE FOR AIRCRAFT

Lawrence F. Santucci and Joseph S. Showalter, Buffalo, N. Y., assignors to Curtiss-Wright Corporation, a corporation of Delaware Application September 1, 1945, Serial No. 614,058

6 Claims. (Cl. 244—121)

This invention is generally related with aircraft construction and is more particularly concerned with improved cockpit closure means.

It is an object of this invention to provide a cockpit with a novel form of closure or canopy which will materially increase the visibility range of the pilot.

It is also an object to provide such a canopy in the form of a single transparent structure and to provide improved and novel structure for securing the same to the aircraft.

A further object resides in the means for movably mounting the canopy in such manner that it may be opened or closed when in flight without subjecting the canopy to air loads of a character tending to tear it from the mountings.

Still another object may be found in the provision of a fuselage structure for the type of canopy herein preferred in which provision is made for exhausting the flow of air coming into the cockpit when the canopy is opened in flight, thus preventing build up of interior air loads.

It is a further object to provide improved and light weight supporting means for a streamlined, one-piece transparent canopy to increase its resistance against air loads, decrease its flexibility and permit ready removal from the aircraft.

These and other objects will be more particularly pointed out in connection with the description of a preferred embodiment of the invention as disclosed in the drawing, in which:

Figure 1 is a side elevational view of the aircraft canopy, the full lines illustrating the closed position and the dotted lines indicating its normal full open position, Figure 2 is a top plan view of the same in which the canopy is only partially opened, Figure 3 is an enlarged but fragmentary elevational detail of the canopy moving means as seen along line 3—3 of Figure 2, Figure 4 is a sectional detail of the motion controlling crank assembly as seen at line 4—4 in Figure 3, Figure 5 is a further fragmentary elevational detail of certain portions of the canopy mounting structure when seen along line 5—5 in Figure 2, and Figure 6 is a schematic view taken at line 6—6 in Figure 2 in which the exhaust air gap is shown to advantage.

In Figures 1 and 2 the aircraft fuselage 10 is provided with a rigidly attached windshield structure 11 having generally streamlined side panels 12 of transparent material and a flat panel 13 for forward vision. The rear margin of this structure is held in place by the substantially circular arched structure 14. A streamlined one-piece transparent canopy 15 is positioned over the cockpit space 16, and when closed has its forward arched leading edge 17 abutting the windshield arch 14. A suitable air sealing strip (not shown) is usually carried by one or the other of these arch members to prevent passage of air therebetween when closed.

The fuselage is formed to provide an upstanding sill structure 18 at each side of the cockpit area 16 and this sill extends rearwardly in a smoothly tapered contour to a rearward zone which is then faired into the upper surface of the fuselage. Similarly, the canopy 15 is provided at each side with a relatively narrow skirt member 20 which follows the tapering form of the sill structure. At the rear of this canopy a conic reinforcing plate 21 has been provided to finish the canopy contour and strengthen the same at this point.

In general the canopy is circular in cross section at every point along its length and this necessitates a careful fairing of the skirt members 20 into the fuselage contour so that when closed, the sliding joint therebetween will offer the least possible drag characteristics in flight. It is also preferred that this joint be sealed against air leakage and accordingly a resilient sealing strip 22 (Figure 3) is secured along the inner surface of the canopy at each side.

In addition to the conic member 21 at the rear end of the canopy, a pair of intermediate cross braces have been applied thereto. The rear one of these braces (Figures 1 and 2) comprises a channel member 25 having flanges 26 for additional stiffening effect. Each end of this channel is provided with a pair of curved foot plates 27 for securement against the inner curved surface of the canopy. The forward brace (Figures 1, 2 and 5) comprises a channel member 28 having stiffening flanges 29, and a pair of foot plates 30 at each end for attachment against the inner surface of the canopy. It is to be noted that these channel shaped braces 25 and 28 are placed at points along the canopy where the greatest air loads are expected to develop, thus aiding greatly in retaining the canopy against outward deflection to break the seal at the sill 18 and guarding against excessive deflection.

The fuselage cockpit opening is provided with a rear cross member 32 of channel form (Figures 2 and 5) which is secured to the sill structure by bracket means 33. In addition, each of these brackets is utilized to support a stationary carriage 34 on which a plurality of roller elements 35 are mounted. A more forwardly positioned fuselage cross brace 36 is also provided to assist in strengthening the fuselage at this point.

Provision for movably attaching the canopy includes a pair of longitudinally extending, spaced track assemblies 38 (Figures 2 and 5) in which the parts are identical but oppositely assembled as appears in Figure 2. The details of one track assembly may be seen in Figure 5 as including a main longitudinal C-shaped beam 39 secured at its ends to the canopy cross braces 25 and 28, and a T-shaped track member 40 mounted on the back of the beam 39 with the leg 41 of the T projecting outwardly. It is noted that the beam 39 and track 40 are located below the braces 25 and 28 to provide clearance for the carriages 34 when the canopy is moved. The track leg 41 is adapted to be embraced by the carriage rollers 35 as is well understood. Accordingly, the forward end 42 of each track member is unobstructed so that upon assembly the tracks can be aligned with the carriages and the canopy pushed forward.

As the canopy moves or is pushed forward over the cockpit area 16 the leading corners thereof, which have been provided with a carriage bracket 44 (Figure 3) on which rollers 45 are mounted, pass over sill tracks 46 and the carriage rollers engage the opposite faces of the upper flanged portion 47 for guiding the canopy at its forward edge. The length of the tracks 46 is chosen so that the forward carriages 44 remain in contact when the canopy is moved rearwardly against stop element now to be described in connection with Figures 2 and 5. A bracket structure 49 is secured to the forward cross beam 28 adjacent the end 42 of each track 40. A pin element 50 is vertically movable in each bracket but is urged downwardly by means of a spring 51 pressing against a tab block 52 fixed to the element 50. The lower end 53 of each pin thus is held in position to strike the forward edge 54 of each carriage 34. When this occurs the canopy can no longer move rearwardly. If the canopy is to be removed entirely it becomes necessary manually to raise each pin 50 by the tab block 52 until the pin ends 53 clear the carriages 34. The arrangement of spring loading each pin assures the proper mounting of the canopy to prevent its accidental movement beyond its full open position either on the ground or in flight.

Normal opening and closing movement of the canopy (Figures 2, 3 and 4) is effected by a hand crank 56 which rotates a drive sprocket wheel 57 and this drives a second sprocket wheel 58 through a chain 59. The sprocket 58 is keyed to a main shaft 60 which extends across the cockpit and is revolvably mounted in the fuselage. Each end of the main shaft carries a pinion gear 61 for rotation therewith. These pinions mesh with rack bars, one of which is shown at 62 fixed to the under side and inwardly of the canopy skirt members 20. The racks are of sufficient length to provide the required travel for fully opening the canopy. In Figure 3 it can be seen that the sprocket chain has been covered by a suitable guard plate 63.

The crank 56 (see Figures 3 and 4) is mounted on a hub 64 for pivotal movement out of the plane of rotation of the sprocket 57 about the axis of pin 65. A coil spring 63 is assembled at this pin 65 for biasing the crank toward the plane of rotation of the sprocket. The crank also carries a lever 66 which is pivotally mounted on pin 67 and this lever carries a locking pin 68. The pin 68 swings in an arcuate slot 69 formed in crank 56 with its center at pin 67. Pin 68 projects through the slot a suitable distance to engage in an aperture 71 formed in the face of the drum 70 and so located as to fall in the path of movement of pin 68 when the lever 66 is directed to coincide with the longitudinal axis of the crank but not otherwise. Thus when the pin registers with the aperture 71 it will be urged thereinto by the spring 63 to prevent further crank movement. When it is desired to rotate the crank, the latter is swung out of the vertical plane until pin 68 clears aperture 71. At this time the lever 66 can be rotated 90 degrees to move the pin in the direction of the slot 69 to a new location which is inwardly of the circular orbit containing the aperture and precluding further crank interference until lever 66 is returned to its locking position in alignment with the crank 56.

Figure 6 illustrates the relationship of the canopy and fuselage sill when the cockpit is opened to the extent shown in Figure 2. The canopy skirt 20 upon opening movement travels away from the sill 18 and a gap 73 is opened up therebetween. Thus the air flowing over the windshield 11 enters the gap between the arched members 14 and 17 forwardly of the pilot and flows rearwardly to escape through the gap 73 on each side of the sill 18. In so doing the canopy is relieved of any air load stress which might tear it away or rupture the single piece of transparent material.

An important characteristic of the canopy mounting arrangement shown and now described resides in the relative shifting of the zone of support for the canopy as the latter moves with respect to the fuselage. In a canopy of this type the initial opening movement immediately establishes an effective air escape gap near the zone of the fuselage cross brace 32 which means that the canopy will experience its greatest loads in that area where it is the weakest. However, the brace 25 on the canopy will afford adequate strength to resist such initial loads since its connection to the fuselage through the tracks 40 and fixed carriages 34 occurs in the zone of high loads. Further opening movement of the canopy will increase the gap area without materially shifting the zone of high load as the canopy moves through the high load zone. In so doing the connection between the canopy and the carriages 34 may be considered to move toward the forward end of the canopy at the same rate at which the canopy moves rearwardly. The result is that the canopy attachment points always remain in the zone of highest loads. The proportion of load distribution between cross braces 25 and 28 is also shifted, but always in favor of the brace closest to the high load zone. In the full open position the canopy is supported very nearly at its center zone by the tracks 40 and carriages 34 in connection with the cross brace 28.

The foregoing relates to a preferred canopy arrangement of the general type referred to as a "bubble" or "tear drop" canopy. The means for attaching and movably arranging the canopy provides a very simple way of exhausting the inflow of air at times when the canopy must be opened in flight. The structure involved is exceedingly simple and thus easily fabricated and assembled. Obviously certain equivalent means and arrangements may be substituted for that shown without departing from the spirit and intended scope of the claims hereto annexed.

What is claimed is:

1. In aircraft, a fuselage having a cockpit opening defined by marginal sills which together define a rearwardly tapering structure, a windshield at the forward zone of the cockpit, a canopy on the fuselage, said canopy being tapered rearwardly, carriage means fixed on said fuselage, longitudinally spaced transverse brace members on said canopy, track means extending between said brace members for cooperation with said carriage means in movably supporting said canopy, and means for moving said tapered canopy between a position contacting said windshield and said sills to close the cockpit and a position rearwardly thereof to open the cockpit whereby, as said canopy is moved rearwardly to provide an air flow escape gap along the cockpit sills, said track means moves with respect to said carriage means to shift the point of canopy support in a forward direction relative to the canopy.

2. In aircraft, a fuselage having a cockpit opening defined by a windshield and marginal sills which together define a structure that tapers rearwardly from the windshield, a canopy for the cockpit, said canopy being rearwardly tapered to effect a closure of the cockpit by engagement with the marginal sills, means for moving said canopy between its cockpit closing position and a position rearwardly thereof to open the cockpit, the rearward movement of said canopy being effective to open a rearwardly divergent gap along the cockpit sills for the escape of air entering the cockpit around the windshield, and means for movably mounting said canopy at spaced points on the fuselage, certain of the points of canopy support being shiftable relative to the canopy in a direction opposite to the direction of canopy movement.

3. In an aircraft structure having a cockpit opening with rearwardly converging side sills, a canopy having generally similar converging side walls to effect a closure of the cockpit upon engagement of said side walls with the sills, and means supporting the canopy for movement in the plane of said sills from such closing position to a position rearwardly thereof for opening the cockpit, such movement being effective to produce a gap between the sill and side wall on each side of the canopy.

4. In an aircraft structure having a cockpit opening with side sills in substantially parallel arrangement at one end thereof and merging into a converging relation at the opposite end thereof, a track secured to said structure and extending along each sill adjacent said one end thereof, track engaging means carried by said structure adjacent the opposite end of said sills, a canopy having side walls similar in contour to said sills and engageable therewith to effect a closure of the cockpit, track engaging means on each side of the canopy engaged with the adjacent track secured to said structure, and track means on the canopy engaged with said track engaging means carried by said structure, whereby the canopy is supported for movement longitudinally of said tracks and track means for opening the cockpit.

5. In an aircraft structure having a cockpit opening, a slidable canopy for closing said opening, said canopy having side walls converging in the direction in which the canopy is slid to uncover the cockpit, the canopy side walls at the diverging ends thereof and the structure along the cockpit side walls being provided with cooperating longitudinal tracks and track engaging means, a transverse member extending across the canopy and a longitudinal track supported thereby adjacent the converging end of the canopy, and track engaging means on said aircraft structure cooperating with the last-mentioned track.

6. In an aircraft structure having a cockpit opening, a slidable canopy for closing said opening, said canopy having side walls converging in the direction in whch the canopy is slid to uncover the cockpit, the canopy side walls at the diverging ends thereof and the adjacent structure along the cockpit side walls being provided with track engaging means and cooperating longitudinally extending tracks, a pair of parallel tracks secured to the canopy and extending longitudinally adjacent the converging end of the canopy and within the confines thereof, end portions of the tracks which extend toward the diverging end of the canopy being supported by a member extending transversely across the canopy between opposed side wall portions thereof, and track engaging means on said aircraft structure for cooperating with said parallel tracks.

LAWRENCE F. SANTUCCI.
JOSEPH S. SHOWALTER.

REFERENCES CITED

The following references are of record in the file of this patent:

UNITED STATES PATENTS

| Number | Name | Date |
| --- | --- | --- |
| 2,125,752 | Saulnier | Aug. 2, 1938 |
| 2,295,345 | Jerman | Sept. 8, 1942 |
| 2,332,158 | Magill et al. | Oct. 19, 1943 |
| 2,361,113 | Lobelle | Oct. 24, 1944 |
| 2,424,245 | Martin | July 22, 1947 |